(12) United States Patent
Peters et al.

(10) Patent No.: US 10,941,893 B2
(45) Date of Patent: Mar. 9, 2021

(54) PIPE COUPLER AND COUPLING METHODS

(71) Applicant: Georg Fischer Harvel LLC, Easton, PA (US)

(72) Inventors: Nicholas Bryant Peters, Benton, AR (US); Thomas G. Sixsmith, Lake Forest, CA (US)

(73) Assignee: Georg Fischer Harvel LLC, Easton, PA (US)

( * ) Notice: Subject to any disclaimer, the term of this patent is extended or adjusted under 35 U.S.C. 154(b) by 405 days.

(21) Appl. No.: 15/875,361

(22) Filed: Jan. 19, 2018

(65) Prior Publication Data

US 2018/0216772 A1 Aug. 2, 2018

Related U.S. Application Data

(60) Provisional application No. 62/452,011, filed on Jan. 30, 2017.

(51) Int. Cl.
| | | |
|---|---|---|
| *F16L 37/12* | (2006.01) | |
| *F16L 47/03* | (2006.01) | |
| *F16L 47/12* | (2006.01) | |
| *F16L 37/098* | (2006.01) | |
| *B29C 65/50* | (2006.01) | |
| *B29C 65/00* | (2006.01) | |

(Continued)

(52) U.S. Cl.
CPC .............. *F16L 47/03* (2013.01); *B29C 65/34* (2013.01); *B29C 65/342* (2013.01); *B29C 65/5057* (2013.01); *B29C 65/5071* (2013.01); *B29C 65/58* (2013.01); *B29C 65/7844* (2013.01); *B29C 65/7855* (2013.01); *B29C 66/1122* (2013.01); *B29C 66/1222* (2013.01); *B29C 66/1224* (2013.01); *B29C 66/52231* (2013.01); *B29C 66/5344* (2013.01); *B29C 66/81471* (2013.01); *F16L 37/098* (2013.01); *F16L 47/12* (2013.01); *B29C 66/71* (2013.01); *F16L 47/32* (2013.01)

(58) Field of Classification Search
CPC ......... F16L 17/06; F16L 21/02; F16L 21/035; F16L 21/04; F16L 21/08; F16L 37/0847; F16L 37/098; F16L 37/0985; F16L 37/12; F16L 37/133; F16L 47/06; F16L 47/065; F16L 47/12
USPC ...... 285/399, 400, 403, 374, 921, 347, 21.1, 285/21.2
See application file for complete search history.

(56) References Cited

U.S. PATENT DOCUMENTS 2,195,492 A * 4/1940 McDonald .............. F16L 37/54
285/330
2,420,858 A * 5/1947 Brownell .............. F16L 37/133
285/319

(Continued)

FOREIGN PATENT DOCUMENTS

DE 102013101172 A1 8/2014
GB 2260381 A 4/1993

*Primary Examiner* — Aaron M Dunwoody
(74) *Attorney, Agent, or Firm* — Bachman & LaPointe, P.C.

(57) ABSTRACT

A pipe coupler has: an axis; and a body portion surrounding the axis. A circumferentially segmented collar extends from a first axial end of the body portion and has an inner diameter surface and an outer diameter surface. A plurality of fingers project from a second axial end of the body portion, axially opposite the first end and have inward radial projections.

21 Claims, 12 Drawing Sheets

(51) Int. Cl.
  *B29C 65/34* (2006.01)
  *B29C 65/58* (2006.01)
  *B29C 65/78* (2006.01)
  *F16L 47/32* (2006.01)

(56) References Cited

U.S. PATENT DOCUMENTS

| | | | | |
|---|---|---|---|---|
| 3,394,954 A | * | 7/1968 | Sarns | F16L 31/00 |
| | | | | 285/319 |
| 3,506,519 A | | 4/1970 | Blumenkranz | |
| 3,588,149 A | * | 6/1971 | Demler | F16L 37/084 |
| | | | | 285/110 |
| 4,288,112 A | * | 9/1981 | Stoll | F16L 37/133 |
| | | | | 285/238 |
| 4,470,575 A | * | 9/1984 | Stoll | F16L 37/133 |
| | | | | 251/149.6 |
| 4,790,571 A | * | 12/1988 | Montanari | F16L 37/133 |
| | | | | 285/86 |
| 4,915,417 A | * | 4/1990 | Sarno | B29C 65/342 |
| | | | | 24/270 |
| 4,927,183 A | * | 5/1990 | Steinmetz | B29C 66/52297 |
| | | | | 285/21.2 |
| 4,929,002 A | * | 5/1990 | Sauer | F16L 33/213 |
| | | | | 285/148.13 |
| 4,958,857 A | * | 9/1990 | Sixsmith | F16L 47/06 |
| | | | | 285/21.2 |
| 5,113,900 A | * | 5/1992 | Gilbert | F16K 15/063 |
| | | | | 137/515.5 |
| 5,150,922 A | * | 9/1992 | Nakashiba | B29C 65/342 |
| | | | | 219/535 |
| 5,178,208 A | * | 1/1993 | Briet | F16L 37/56 |
| | | | | 165/104.32 |
| 5,433,484 A | * | 7/1995 | Ewen | B29C 66/1122 |
| | | | | 285/123.14 |
| 5,911,895 A | | 6/1999 | Porfido et al. | |
| 6,199,919 B1 | * | 3/2001 | Kawasaki | F16L 37/0985 |
| | | | | 285/256 |
| 6,250,686 B1 | * | 6/2001 | Becker | B29C 65/342 |
| | | | | 285/21.2 |
| 6,481,759 B1 | * | 11/2002 | Kawasaki | F16L 37/0985 |
| | | | | 285/319 |
| 2002/0000721 A1 | * | 1/2002 | Ohya | F16L 13/146 |
| | | | | 285/322 |
| 2004/0087986 A1 | * | 5/2004 | Ott | A61M 1/10 |
| | | | | 606/153 |
| 2004/0232696 A1 | * | 11/2004 | Andre | F16L 37/0985 |
| | | | | 285/319 |
| 2006/0016552 A1 | | 1/2006 | Barbone et al. | |
| 2006/0197338 A1 | * | 9/2006 | Ziu | B29C 65/342 |
| | | | | 285/21.1 |
| 2008/0007044 A1 | * | 1/2008 | Kertesz | F16L 37/0847 |
| | | | | 285/95 |
| 2008/0061554 A1 | * | 3/2008 | Baker | F16L 17/06 |
| | | | | 285/321 |
| 2015/0008662 A1 | * | 1/2015 | Schmidt | B29C 65/7855 |
| | | | | 285/21.2 |
| 2016/0047502 A1 | * | 2/2016 | Varghese | E21B 17/043 |
| | | | | 285/89 |
| 2016/0146387 A1 | * | 5/2016 | Hunt | F16L 25/0072 |
| | | | | 285/81 |
| 2016/0363247 A1 | * | 12/2016 | McCure | F16L 21/06 |
| 2018/0141249 A1 | * | 5/2018 | Kuhlhoff | F16L 47/20 |
| 2018/0142822 A1 | * | 5/2018 | Felstead | F16L 33/225 |

* cited by examiner

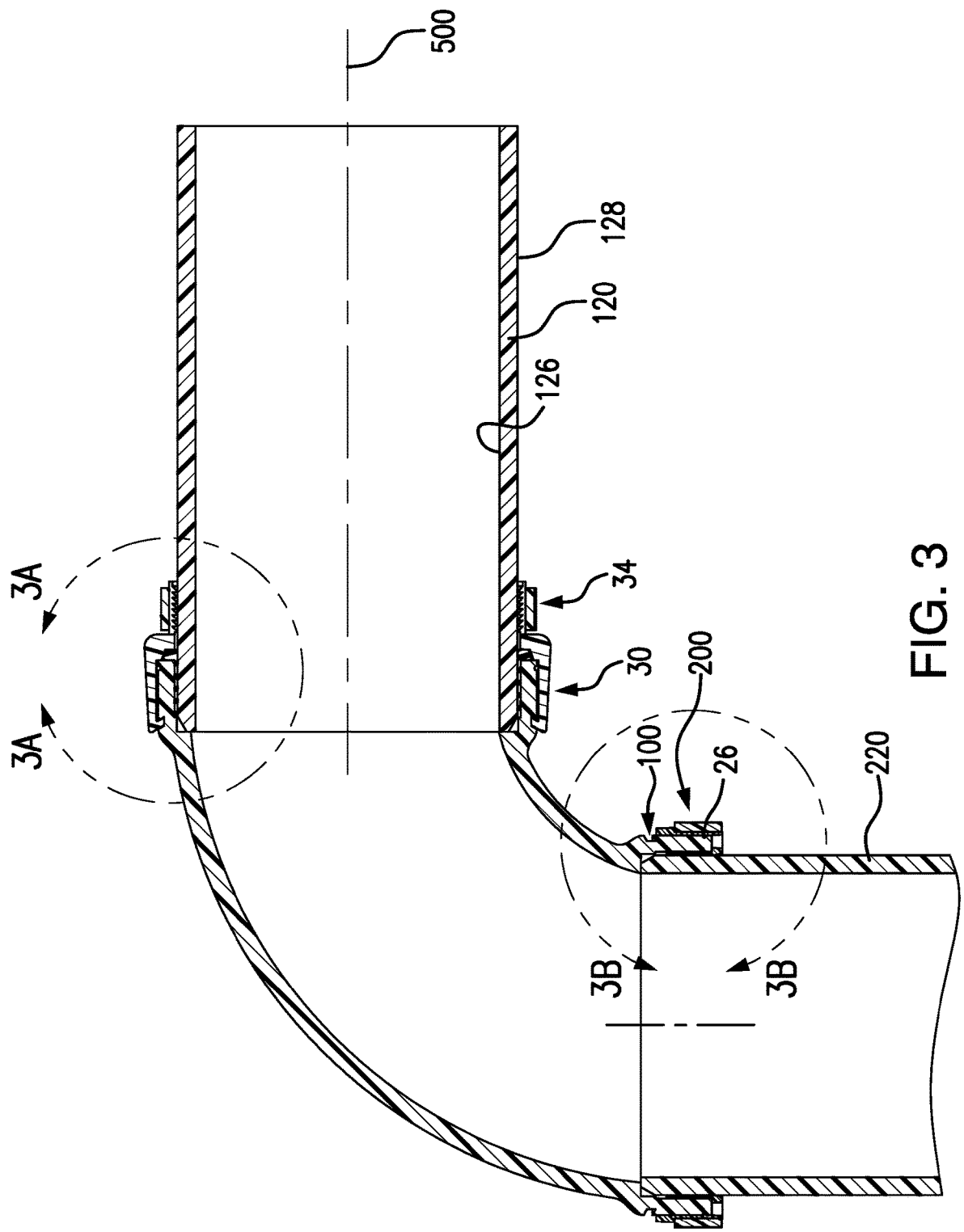

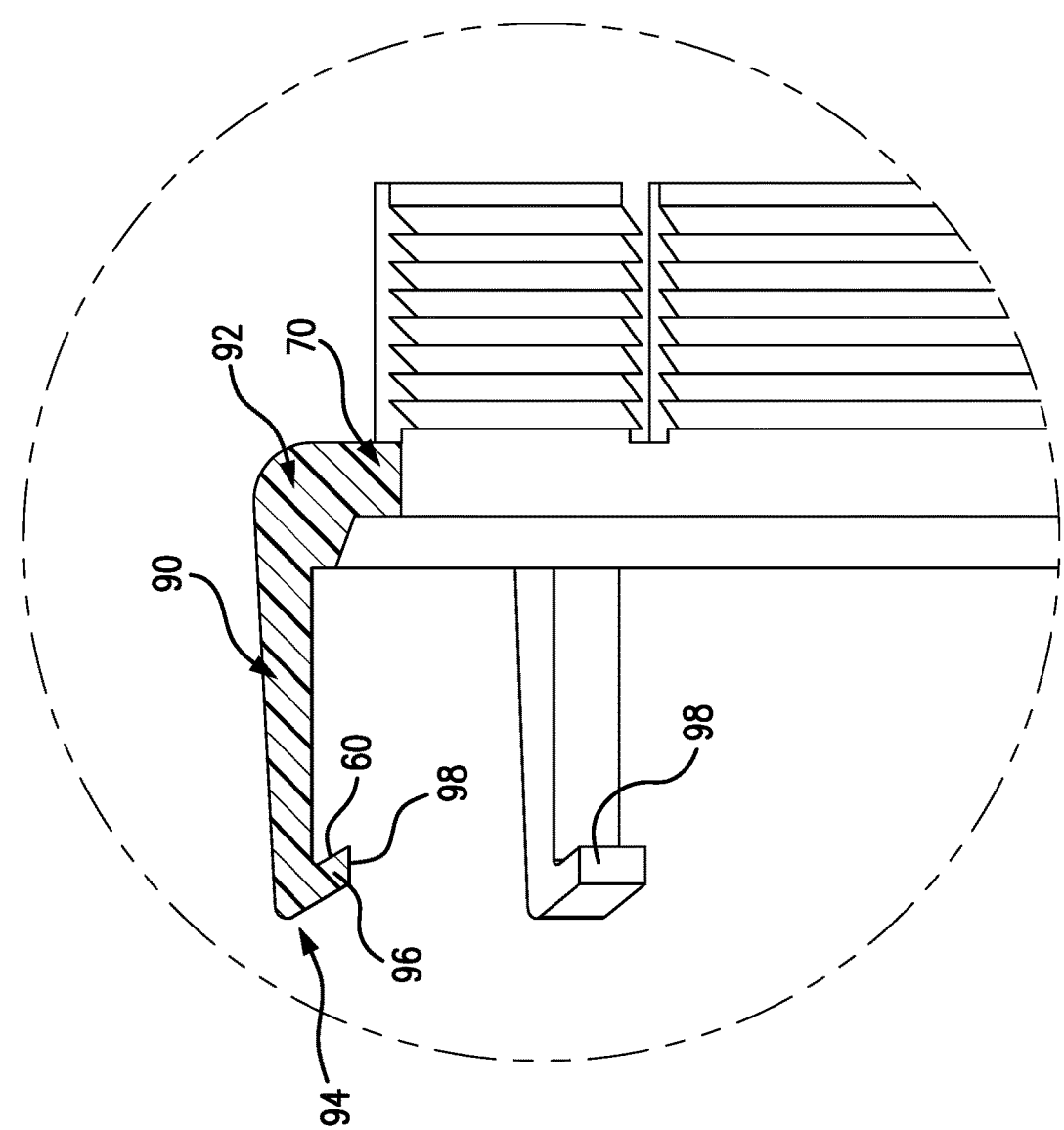

PIPE COUPLER AND COUPLING METHODS

CROSS-REFERENCE TO RELATED APPLICATION

Benefit is claimed of U.S. patent application Ser. No. 62/452,011, filed Jan. 30, 2017, and entitled "Pipe Coupler and Coupling Methods", the disclosure of which is incorporated by reference herein in its entirety as if set forth at length.

BACKGROUND

The invention relates to pipe joining. More particularly, the invention relates to pipe joining by electrofusion.

A well-developed field exists in polymeric piping systems. Perhaps the most well-known thermoplastic material for pipes and pipe fittings is polyvinyl chloride (PVC). PVC pipes and fittings are typically joined to each other via the use of a solvent cement to form joints characterized by solvent weld/bonds. Other solvent-weldable materials include chlorinated polyvinyl chloride (CPVC) and acrylonitrile butadiene styrene (ABS).

It may be less practical to solvent weld other thermoplastics such as polyethylene (PE, including high density polyethylene (HDPE) and low density polyethylene (LDPE)), polypropylene (PP), polystyrene (PS), and polybutylene (PB). Thermal welding provided via electrofusion is an alternative to solvent welding. United Kingdom Patent Application GB2260381A and US Patent Application Publication US2006/0016552A1 disclose systems wherein resistive heating elements are at least partially embedded in fittings. A pipe may be inserted into the fitting so as to be encircled by the heating element.

U.S. Pat. No. 3,506,519 discloses a collar/fitting assembly comprising a plastic fitting, an electrofusion collar (i.e., containing the heating element), and a clamp. Additionally, such collars are available from Georg Fischer Harvel LLC, Little Rock, Ark. and Easton, Pa., US (e.g., under the trademark Fuseal II). Several of the Fuseal II collars include an inner wall containing the heating element and a radially spaced-apart segmented outer wall for engaging the clamp. The electrofusion collar is inserted into the fitting socket and, in turn receives the end of a pipe (or a male fitting spigot). The clamp is tightened around the fitting (or collar outer wall) to radially compress the fitting and collar to the pipe to insure no air enters the welding zone.

The heating element may be energized by an electric power source to heat the fitting and the pipe sufficiently to weld the two together. Exemplary power sources are found in U.S. Pat. No. 5,911,895 and are available from Georg Fischer Harvel LLC, Little Rock, Ark. and Easton, Pa., US (e.g., as the MSA family of electrofusion units).

US Patent Application Publication US2015/008662A1 ("the '662 publication"), published Jan. 8, 2015 and entitled "Electrofusion Fittings and Methods", the disclosure of which is incorporated by reference herein in its entirety as if set forth at length, discloses an improvement on the Fuseal II fitting. This is available from Georg Fischer Harvel LLC, Little Rock, Ark. and Easton, Pa., US (e.g., under the trademark Fuseal).

SUMMARY

One aspect of the disclosure involves a pipe coupler comprising: an axis; a body portion surrounding the axis; a circumferentially segmented collar extending from a first axial end of the body portion and having an inner diameter surface and an outer diameter surface; and a plurality of fingers projecting from a second axial end of the body portion, axially opposite the first end and having inward radial projections.

In one or more embodiments of any of the foregoing embodiments, the inner diameter surface has surface enhancements.

In one or more embodiments of any of the foregoing embodiments, the surface enhancements comprise circumferential ridges.

In one or more embodiments of any of the foregoing embodiments, the pipe coupler is a unitary single-piece plastic molding.

In one or more embodiments of any of the foregoing embodiments, the plastic is glass-filled.

In one or more embodiments of any of the foregoing embodiments, the plastic is polyphenylene sulfide.

In one or more embodiments of any of the foregoing embodiments, the body portion is a full annulus.

In one or more embodiments of any of the foregoing embodiments, the inward radial projections extend radially inward and axially back toward the body portion.

In one or more embodiments of any of the foregoing embodiments, a kit comprises the pipe coupler and further comprises: a band clamp dimensioned to encircle and compress the collar; and an annular gasket.

In one or more embodiments of any of the foregoing embodiments, the gasket comprises the unitarily molded combination of: a sleeve; and a protuberant ring at an end of the sleeve.

In one or more embodiments of any of the foregoing embodiments, a method for using the pipe coupler comprises: installing the pipe coupler to a pipe; tightening a clamp surrounding the segmented collar to clamp the segmented collar to the pipe; and installing the pipe coupler and pipe as a unit to a pipe fitting via axial translation: inserting an end portion of the pipe into an end portion of the pipe fitting; and the finger projections becoming captured behind an adjacent surface of an end portion of the pipe fitting.

In one or more embodiments of any of the foregoing embodiments, the method further comprises applying a gasket to the pipe.

In one or more embodiments of any of the foregoing embodiments, the translating compresses a gasket between a rim of the fitting end portion and the body portion.

In one or more embodiments of any of the foregoing embodiments, the method further comprises releasing an external force providing the translating so as to leave: the gasket compressed between the rim of the fitting end portion and the body portion; and the fingers under axial tension.

In one or more embodiments of any of the foregoing embodiments, a pipe joint comprises the pipe coupler and further comprises: a pipe; a clamp holding the collar portion to the pipe; and a fitting having an end portion receiving an end portion of the pipe and having a backlocked engagement with the finger projections.

In one or more embodiments of any of the foregoing embodiments, the pipe joint further comprises a gasket compressed between the fitting, the pipe coupler, and the pipe.

In one or more embodiments of any of the foregoing embodiments, the fingers are under axial tension.

Another aspect of the disclosure involves a pipe fitting comprising: an end portion having an inner diameter surface, an outer diameter surface and a rim; first means on the end portion for engaging an electrofusion collar; and second means on the end portion for engaging fingers of a coupler alternatively to the electrofusion collar.

In one or more embodiments of any of the foregoing embodiments, the second means comprises an undercut surface.

Another aspect of the disclosure a method for using a plurality of identical pipe fittings, the pipe fittings comprising: an end portion having an inner diameter surface, an outer diameter surface and a rim. The method comprises with a first said fitting: installing a heating element to the end portion; inserting a first pipe into the end portion; and energizing the heating element to fuse the first pipe to the first said fitting. The method further comprises with a second said fitting: installing a pipe coupler to a second pipe; installing the pipe coupler and second pipe as a unit to the second pipe fitting via axial translation: inserting an end portion of the pipe into an end portion of the pipe fitting; and projections of the pipe coupler becoming captured behind an adjacent surface of the end portion of the second pipe fitting.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 3 is a central vertical/longitudinal sectional view of the pipe assembly taken along line 3-3 of FIG. 2 and further having a second joint.

FIG. 9A is an enlarged view of the coupler.

Like reference numbers and designations in the various drawings indicate like elements.

DETAILED DESCRIPTION

Figure 1:
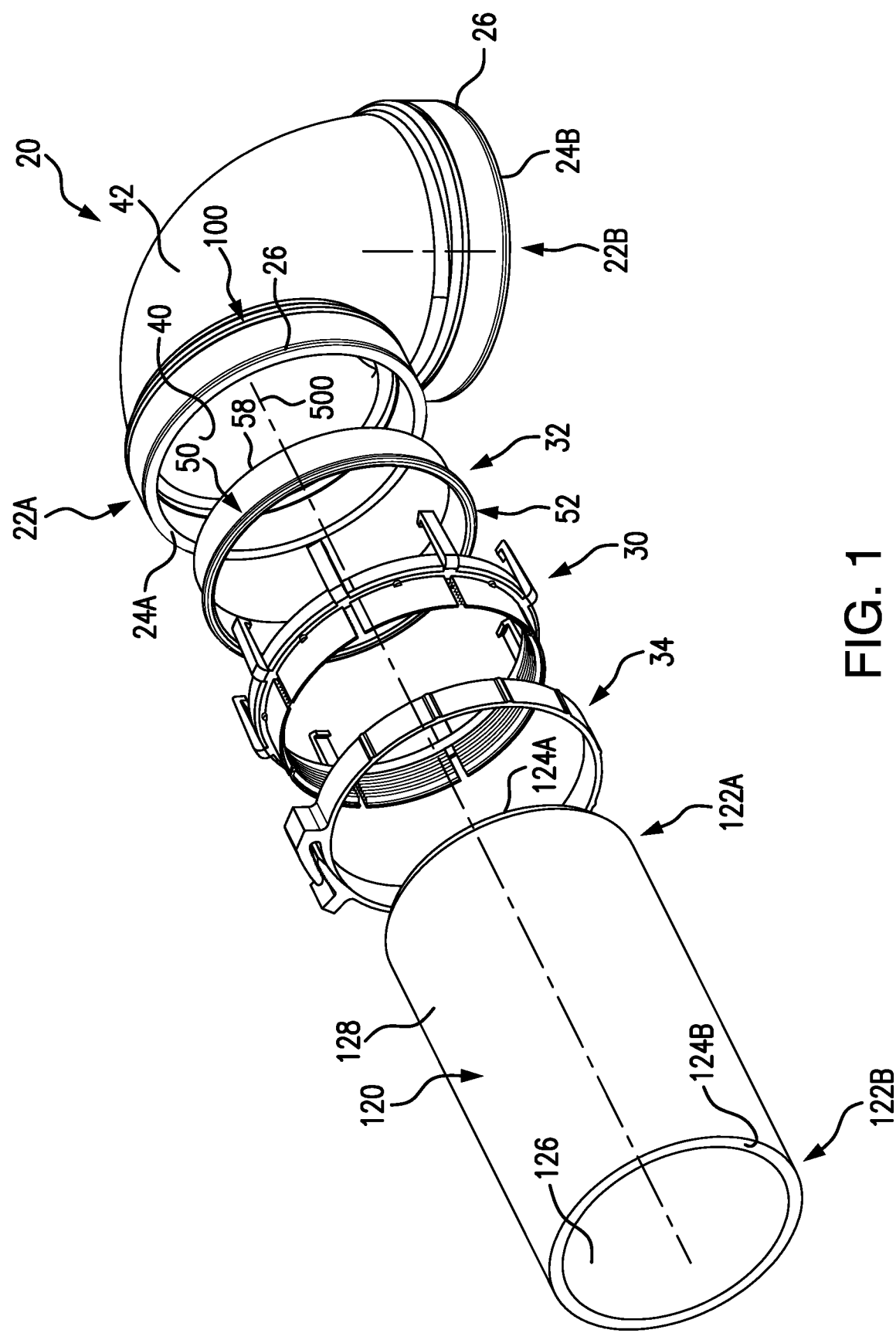
FIG. 1 is an exploded view of a pipe assembly including a first joint.
Figure 2:
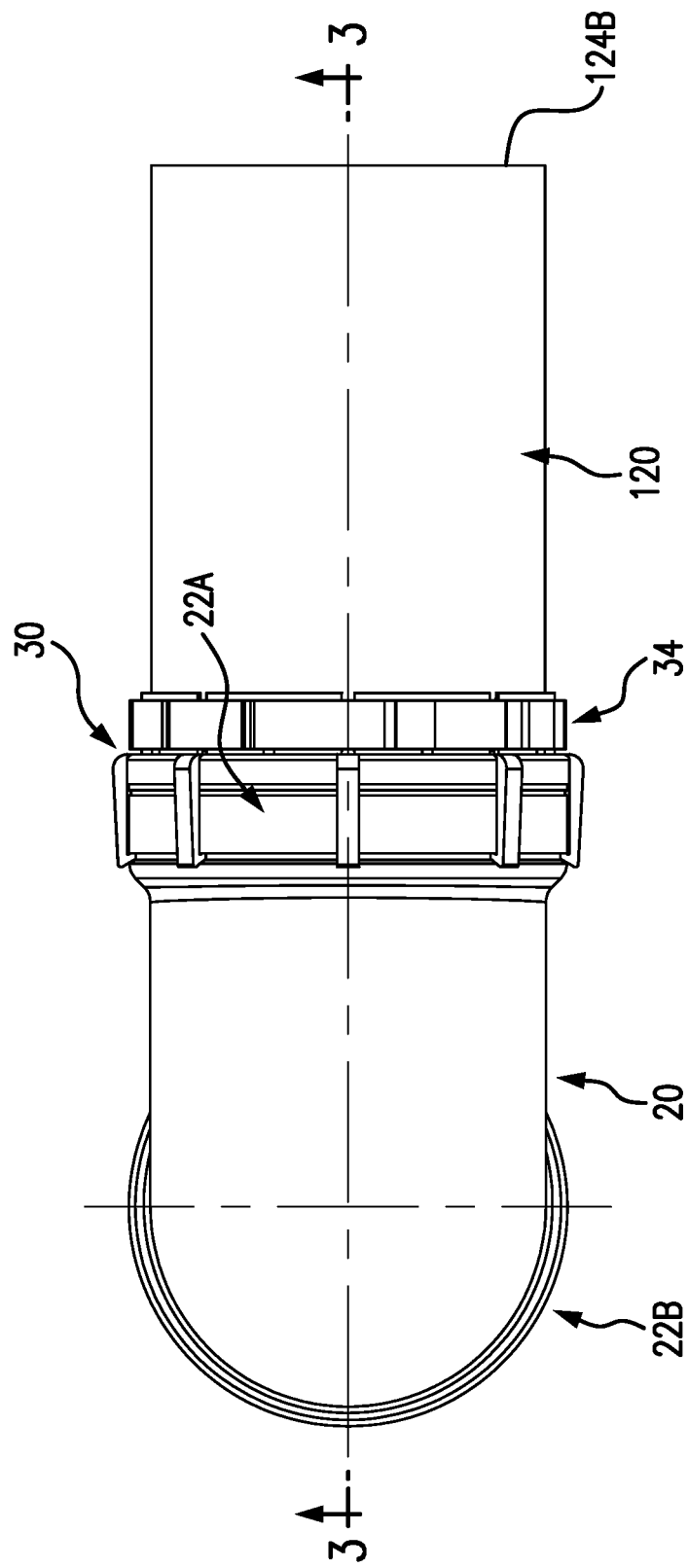
FIG. 2 is a top view of the pipe assembly.

FIG. 1 shows an assembly of a fitting 20 receiving an end portion 122A of a pipe 120 and secured thereto via a coupler 30. More particularly, it shows one branch/end 22A of a fitting that may have several ends/branches/ends (e.g., a termination, an elbow (shown having a second end 22B), a straight coupler, an adapter, a T-fitting, a Y-fitting, and/or variations on any of these such as a valve body). Exemplary nominal pipe outer diameters are 1 inch to 8 inches (2.5 centimeters to 20 centimeters), more particularly 1½ inches to 6 inches (3.8 centimeters to 15 centimeters). An axis 500 may represent a central longitudinal axis of the fitting at the end 22A, the pipe, the coupler, and the gasket.

Figure 3A:
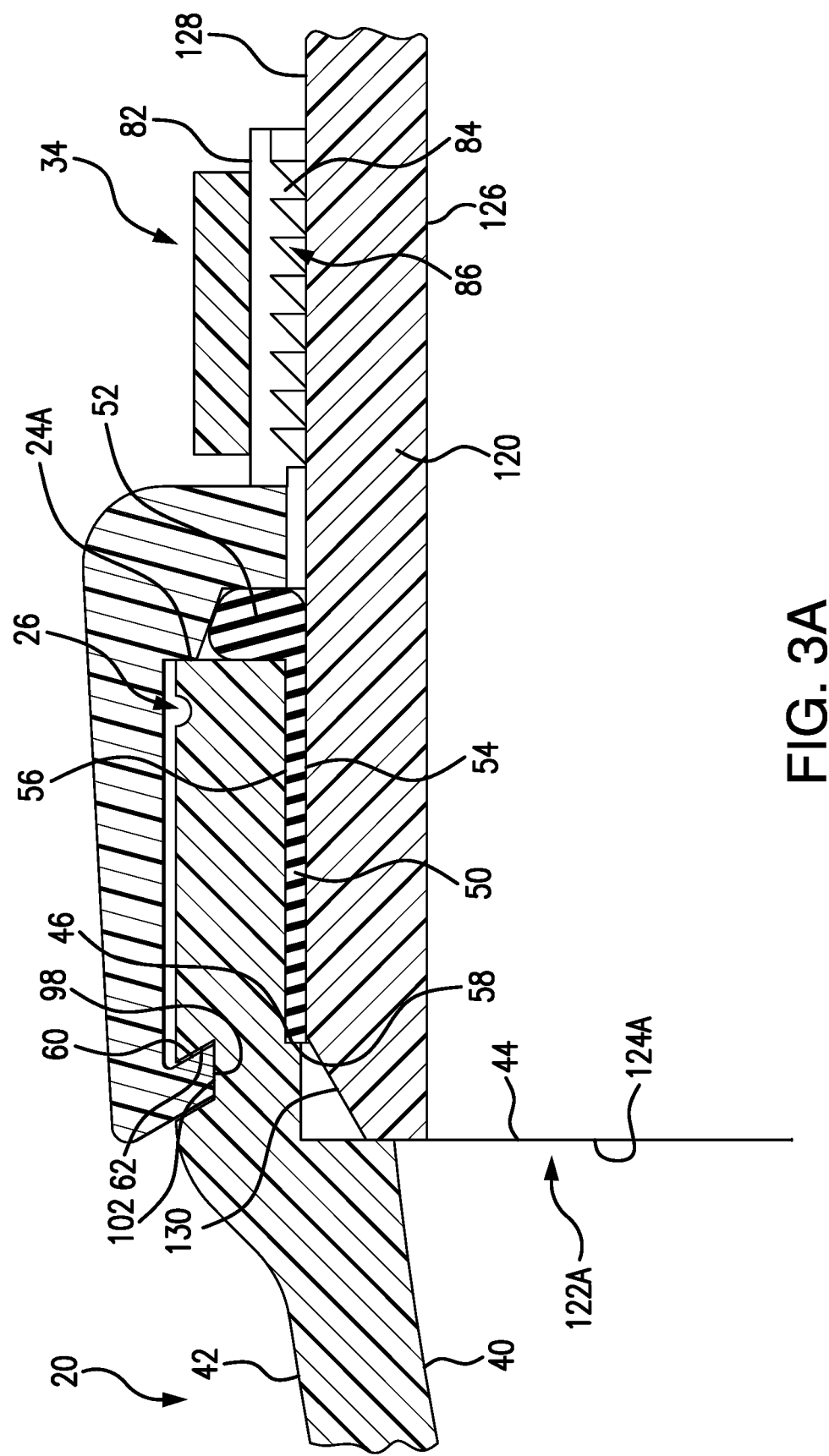
FIG. 3A is an enlarged view of the first joint.
Figure 3B:
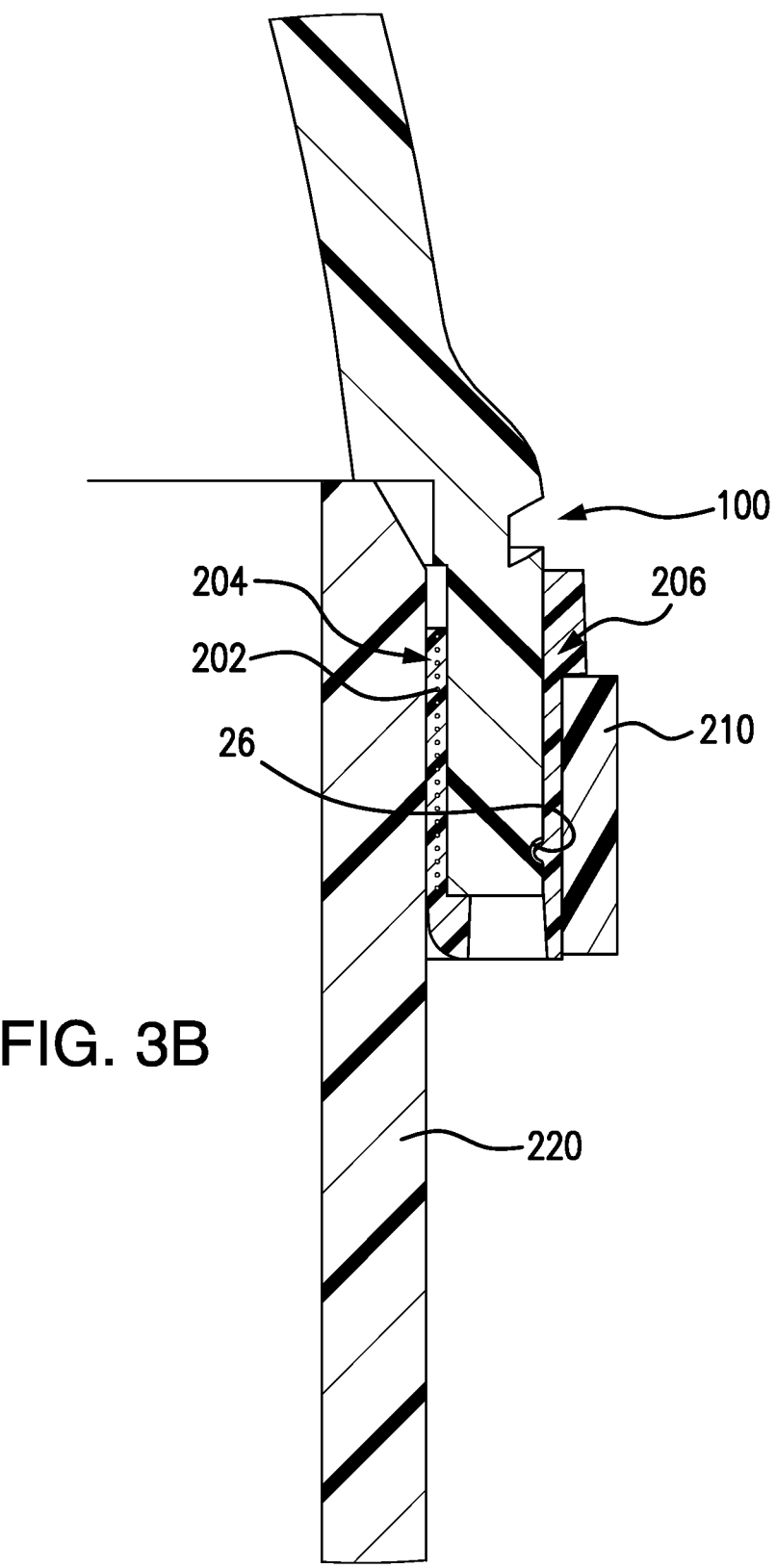
FIG. 3B is an enlarged view of a second joint.

As is discussed below, the second end portion 122B of the pipe may be free, may be coupled to a similar end portion of a second fitting via a similar coupler, may be coupled to a differing end portion of a second fitting via differing means, or may be coupled to a similar end portion of a second fitting via differing means. In one group of examples of the last of these options, the fitting ends are configured to allow alternative use of the coupler 30 for a mechanical joint or an electrofusion collar (e.g., a collar 200 (FIG. 3) as disclosed in the '662 publication). The FIG. 3 collar 200 secures a portion of a second pipe 220. FIG. 3B shows a heating element (coil) 202 embedded in an inner wall 204 of the collar 200 and a band clamp 210 compressing an outer wall 206 of the collar against the fitting. Or, a given fitting may have only one type of joint but different identical fittings may have different types of joints.

The fitting ends 22A, 22B define coupling interfaces. As is discussed below, the exemplary configuration is based on the interface of a Fuseal or '662 publication fitting and facilitates alternative joining to a pipe alternatively via a Fuseal or '662 publication electrofusion collar or via the coupler 30. For that purpose, recessed from respective rims 24A, 24B, the ends 22A, 22B have exterior or outer diameter (OD) surface grooves or channels 26 for receiving corresponding inward radial projections of the '662 publication electrofusion collar.

As is discussed further below, the coupler 30 is part of a coupling system that also comprises a gasket 32 and a band clamp 34.

The pipe end portions 122A, 122B have respective rims 124A, 124B. The pipe also has an interior or inner diameter (ID) surface 126 (FIG. 3A) and an exterior or outer diameter (OD) surface 128. The fitting 20 further includes an ID surface 40 and an OD surface 42. At each end 22A, 22B, the exemplary ID surface has a pair of steps defining a pair of respective radial shoulder surfaces 44, 46. In the exemplary implementation, these correspond to surfaces in a Fuseal or '662 publication fitting with the surface 44 acting as a pipe stop abutting the rim 124A or 124B when the pipe is installed and the surface 46 positioned to contact or nearly contact the electrofusion coil portion of the electrofusion collar. In the exemplary implementation, the pipe end portion also has an exterior bevel surface 130 for guiding insertion.

In the exemplary implementation, the gasket 32 comprises a sleeve portion 50 and a protuberance (ring) 52 at one end of the sleeve portion. The sleeve portion 50 is dimensioned to fill the space which otherwise would have been occupied by the coil portion of the Fuseal or '662 publication collar. The protuberance (e.g., which may have a relaxed cross-section of approximately circular form) functions for sealing as is discussed below. In the exemplary implementation, the gasket thus has an inner diameter (ID) surface 54 against the pipe OD surface 128 and an outer diameter (OD) surface 56 against the ID surface of the fitting along the end 22A. The sleeve end 58 axially opposite the protuberance may abut the shoulder surface 46.

In the exemplary implementation, in the installed condition, the coupler 30 holds the protuberance 52 in sealing compressive engagement with the rim 24A and the pipe OD surface 128 so as to maintain a seal between pipe and fitting. To maintain this engagement, the coupler 30 holds the protuberance in axial compression which, via deformation, becomes radial compression as well. To maintain this engagement, the coupler is rigidly held to the pipe against axial translation via the clamp 34 and to the fitting via an axially backlocked interfitting of respective surfaces 60 and 62 of the coupler and fitting. The axial backlocking prevents (or at least resists) axial extraction of the pipe from the fitting and maintains compression of the gasket protuberance 52.

Figure 4:
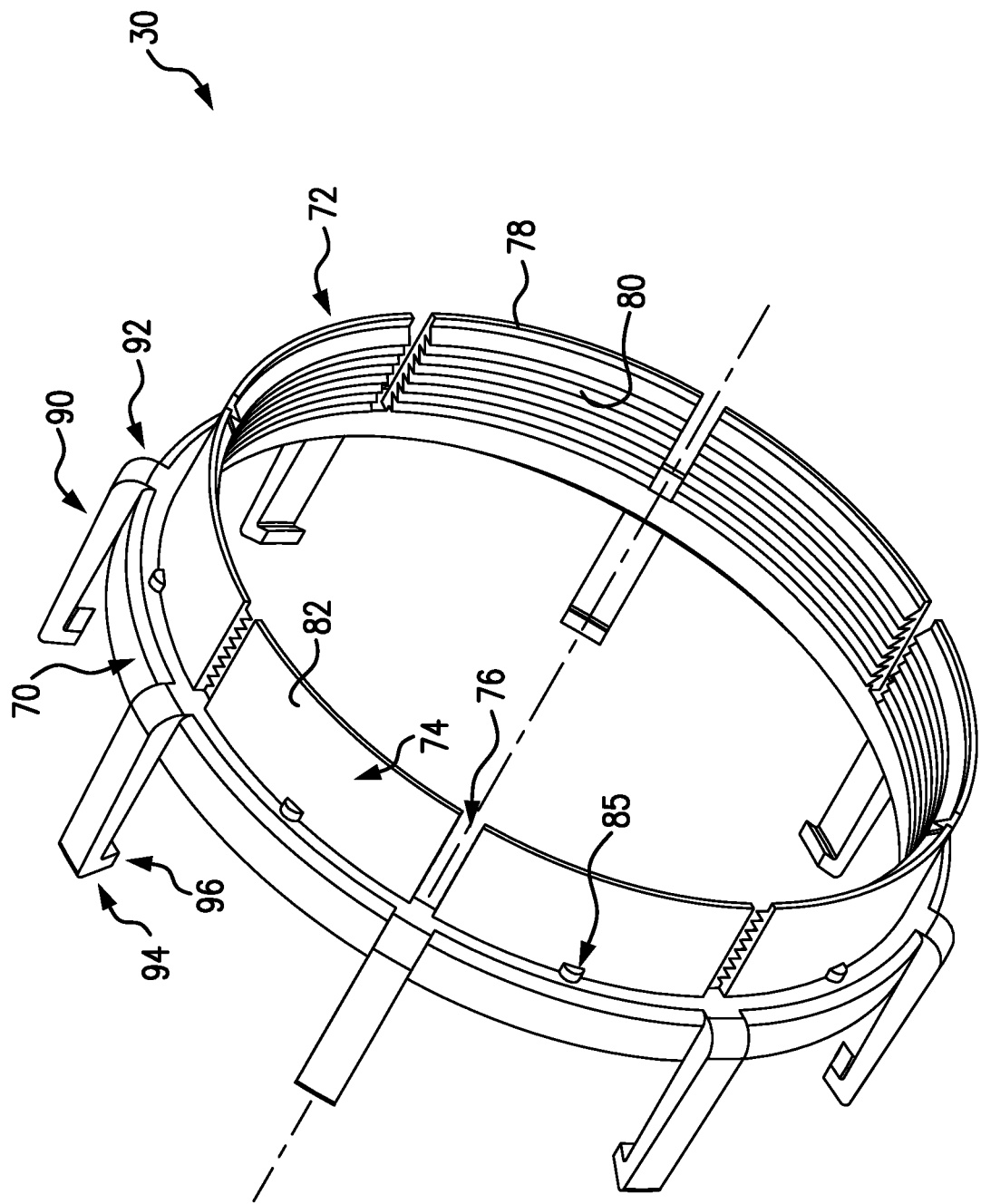
FIG. 4 is a first view of a coupler of the first joint.
Figure 5:
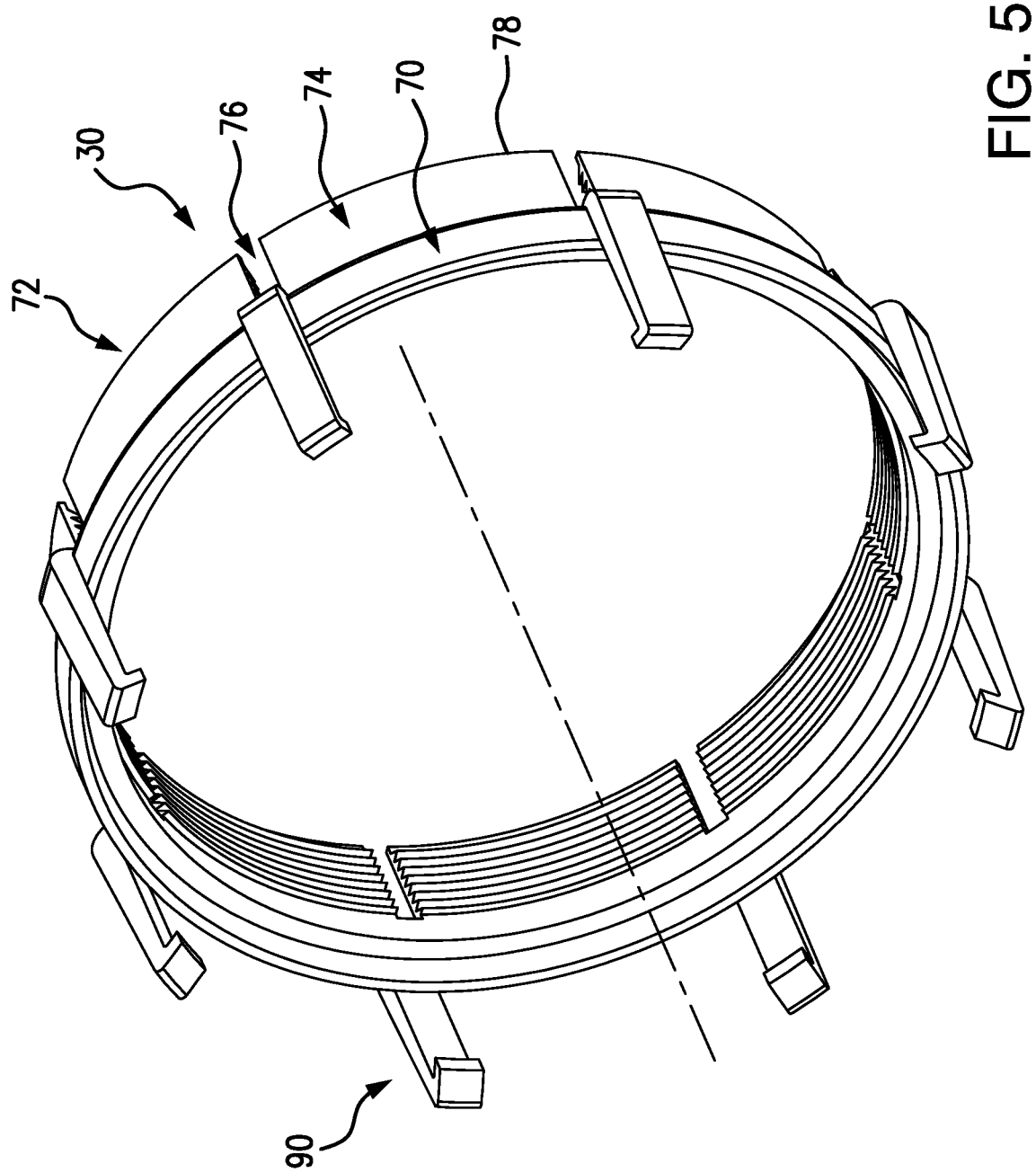
FIG. 5 is a second view of the coupler.
Figure 6:
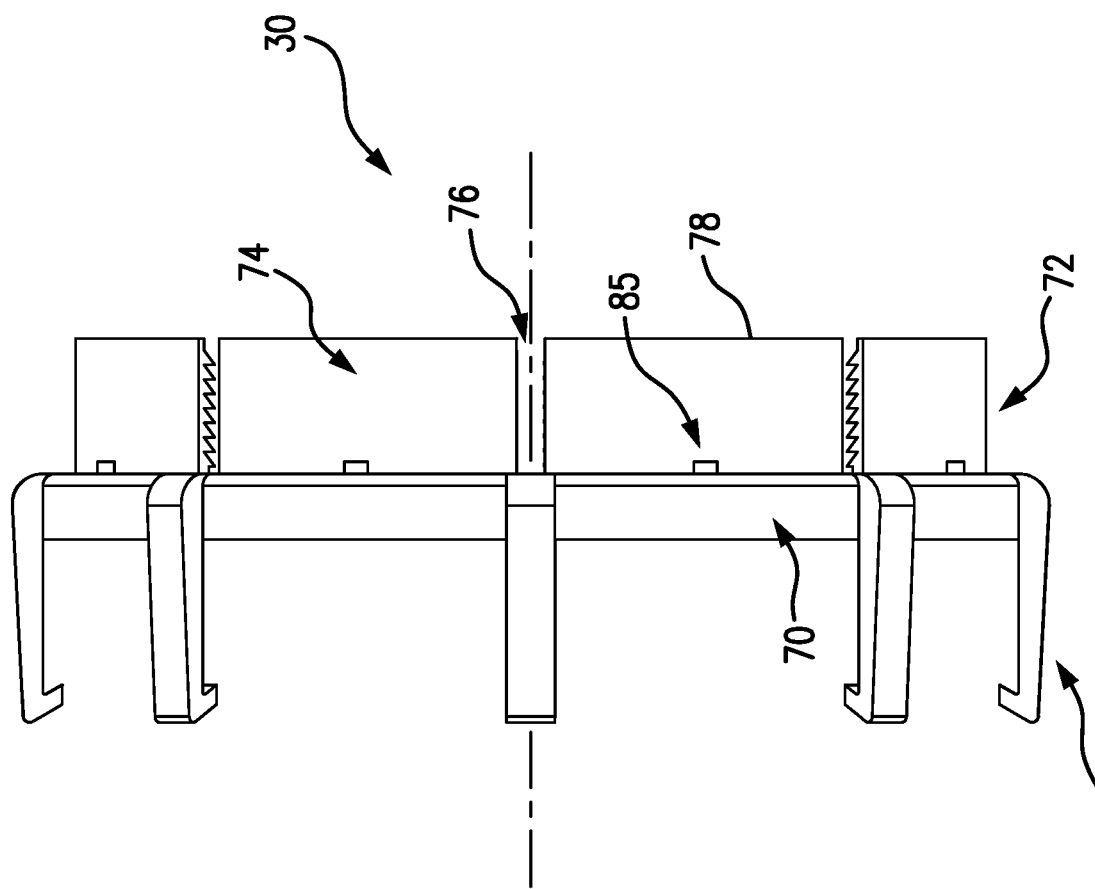
FIG. 6 is a side view of the coupler.
Figure 7:
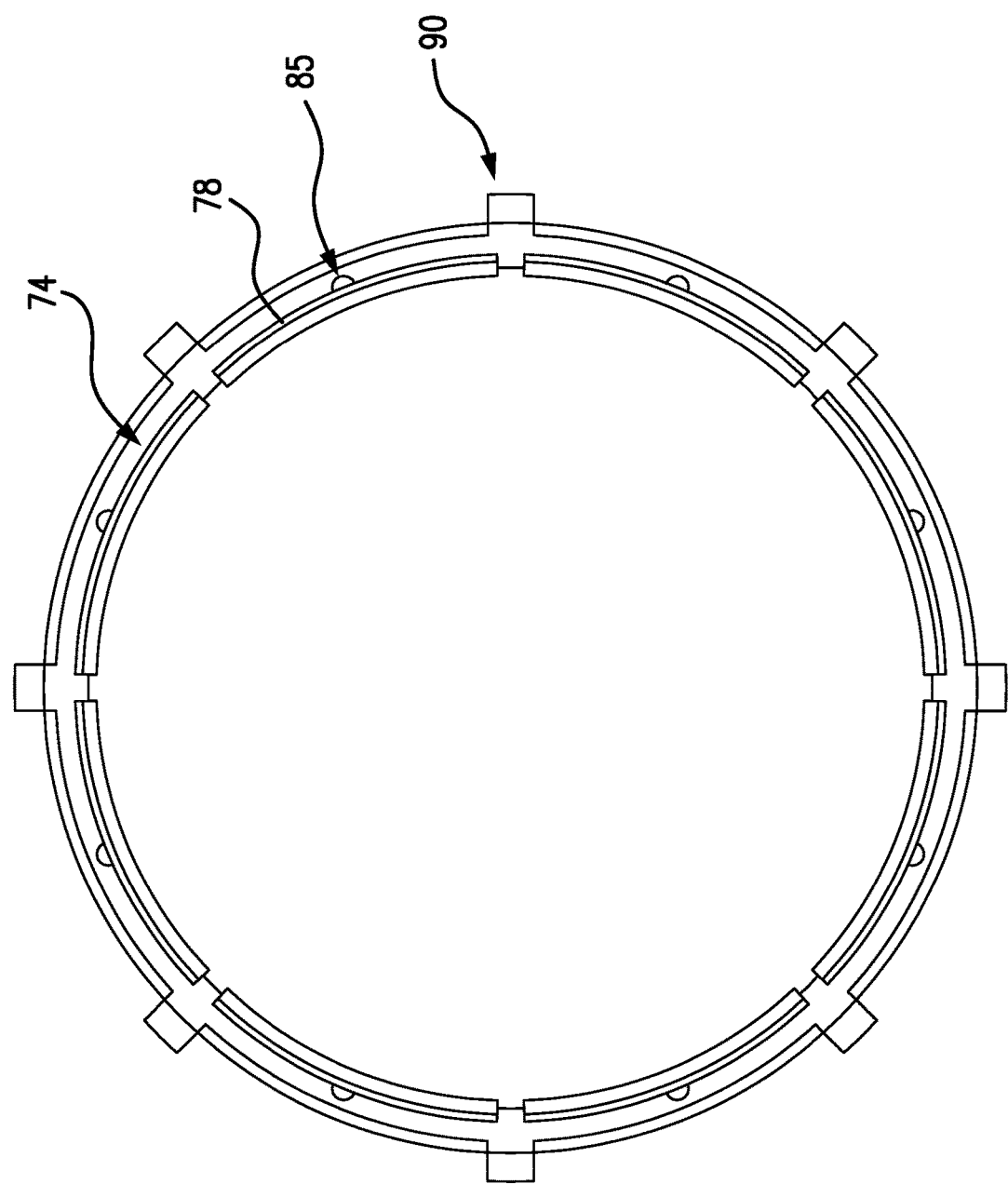
FIG. 7 is a first end view of the coupler.
Figure 8:
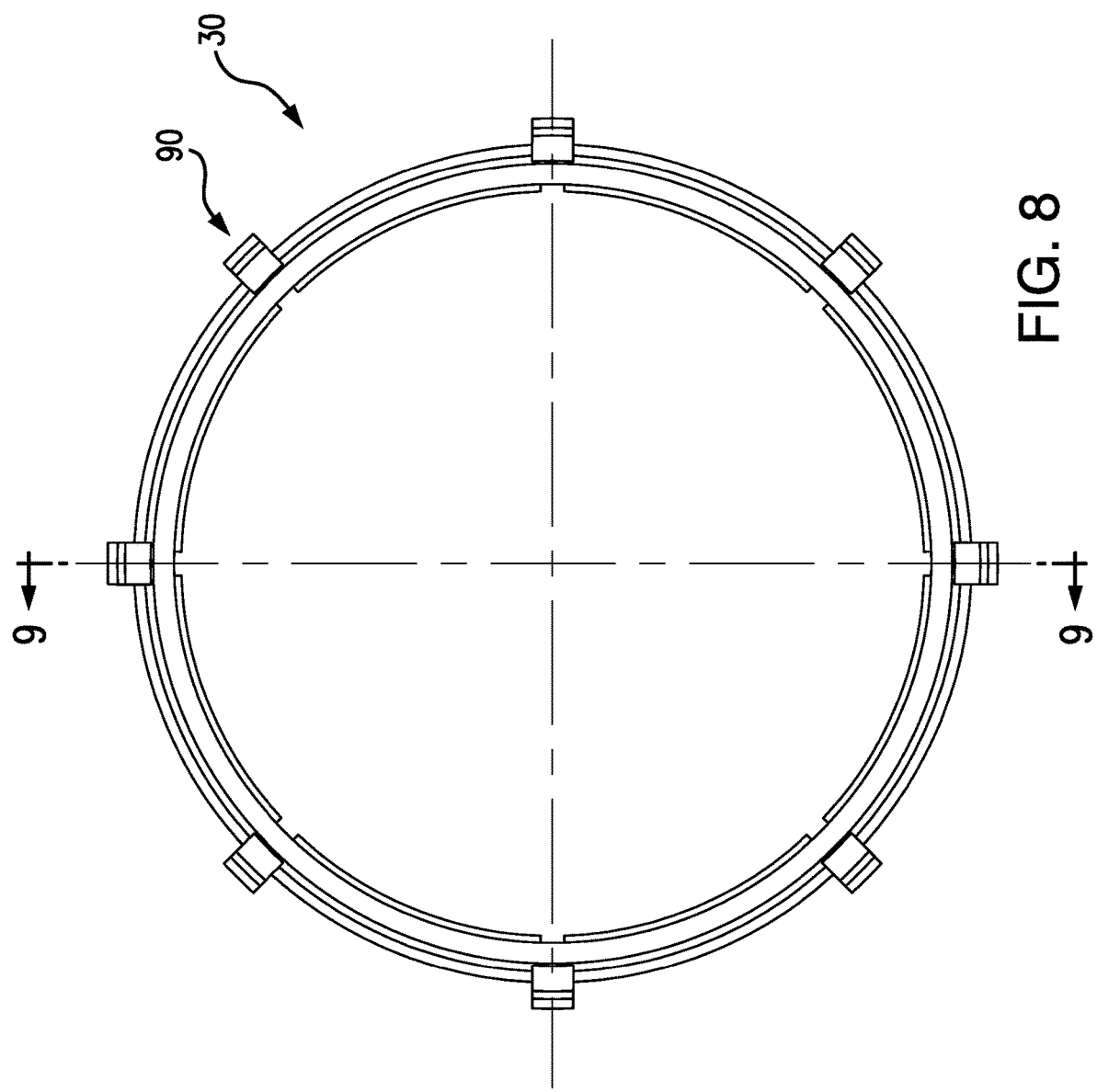
FIG. 8 is a second end view of the coupler.

The exemplary coupler 30 (FIG. 4) comprises a full annulus main body portion (main body) 70. A circumferentially segmented collar 72 axially projects from one end of the main body 70 as a plurality of segments 74 separated by respective gaps 76 (e.g., axial slots). The collar 72 and its segments extend to axial ends or rim portions 78 and have an interior or inner diameter (ID) surface 80 and an exterior or outer diameter (OD) surface 82. The exemplary inner diameter surface is formed with a series of inward annular projections 84 (FIG. 3A) and grooves 86. These provide surface enhancements to bite into and maintain axial engagement with the pipe OD surface 128 under compression from the clamp 34. Along the OD surface 82, the collar 72 may bear features for axially retaining or positioning the clamp 34 with the clamp band ID surface contacting the collar OD surface. The exemplary such features 85 (FIG. 4) axially space the clamp away from the main body 70 to ease the inward flexing of the segments by the clamp. If the clamp abutted the main body 70, it would likely be too difficult to flex root portions of the segments radially inward to provide required engagement with the pipe.

Figure 9:
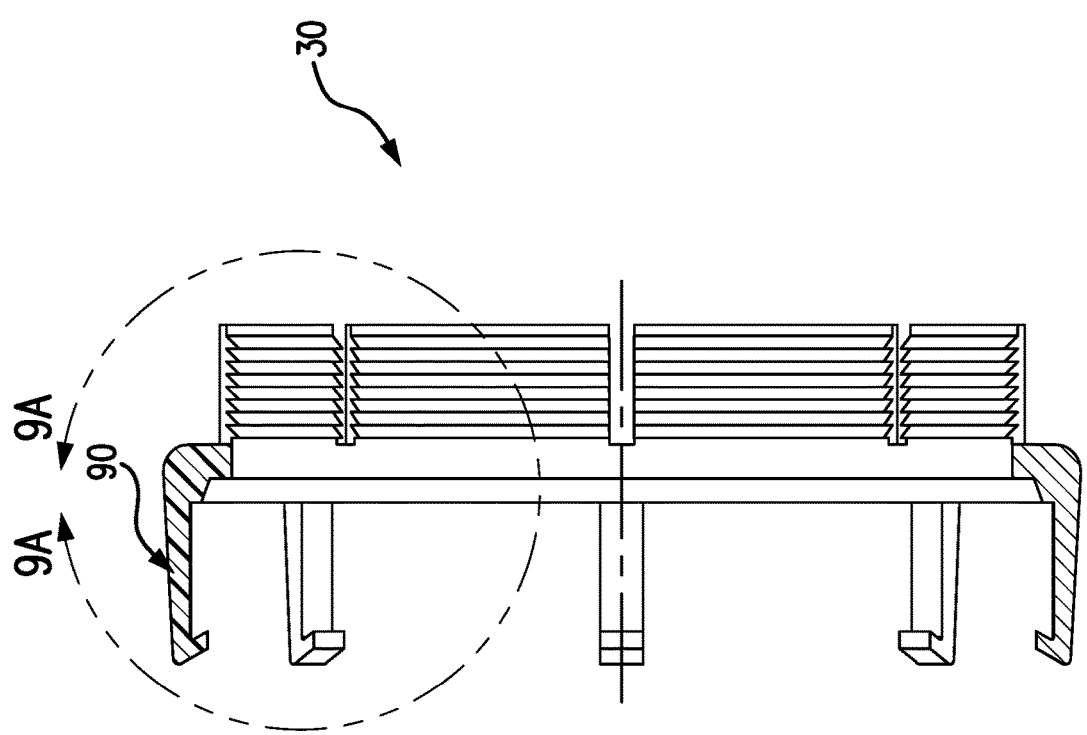
FIG. 9 is a central longitudinal sectional view of the coupler taken along line 9-9 of FIG. 8.

For engaging the fitting, the coupler 30 (FIG. 4) includes a plurality of fingers 90 protruding axially from the main body 70 opposite the collar 72. The fingers extend from proximal root portions 92 to distal ends 94. Near the distal ends 94, the fingers bear inward radial projections 96 (FIG. 9A). The exemplary inward radial projections 96 extend radially inward and axially back toward the main body 70 and have axial undersides forming, in combination, the surface 60 (FIG. 3A). The radial inboard end portions of the projections 96 are received in a complementary recess or channel 100 (FIG. 1) of the fitting end. The channel 100 has a first sidewall forming the surface 62 (FIG. 3A). The exemplary channel 100 has a base 102 (FIG. 3A) which may contact a radially inboard end 98 of the installed projections.

In the exemplary embodiment, the surfaces 60 and 62 are angled such that an extractive force applied to the pipe and coupler produces a camming interaction between the surfaces 60 and 62 tending to drive the projections 96 radially inward into firmer engagement with the channel 100 (rather than an opposite orientation producing an outward camming allowing the release of the fingers).

In an exemplary sequence of operation, the coupler may first be slid onto the pipe beyond what will be on its ultimate intended position. The gasket may then be slid onto the pipe to its ultimate intended position. This ultimate intended position may be determined by measuring and marking the pipe or by registering some feature of the gasket with some feature of the pipe (e.g., the end 58 with an end of the bevel surface 130).

The coupler may then be slid back to contact the gasket in an ultimate axial relationship to the pipe. Thereupon, the band clamp may be applied (if not already loosely applied) to the collar portion and tightened to lock the coupler to the pipe. In the exemplary implementation, for precise axial registry of pipe and coupler, the components are dimensioned so that this ultimate relative position places the axial extreme of the finger distal ends 94 coplanar with the axial extreme of the rim 124A. Thus, for example, a flat plate, or other thing may be used to position the coupler prior to clamping by abutting the plate to the rim 124A and sliding the coupler to also abut the plate. Even a side of another length of pipe may be used for this purpose. Alternatively, one may just measure back from the rim of the pipe by the appropriate pre-determined distance, mark it, and locate the fitting assembly to that mark.

In an alternative implementation, the gasket 32 might be placed in the fitting end portion and not preassembled to the pipe.

In the exemplary implementation, after subassembly of the coupler 30 and gasket 32 to the pipe, the coupler and pipe may be slid into engagement with the fitting. To guide installation, the bevel surface 130 may contact an ID extreme of the rim 24A and a correspondingly inclined distal surface of the finger ends may engage an outboard portion of the rim 24A. The inclination of the distal ends 94 is oriented so that such engagement produces an outward camming interaction flexing the fingers radially outward and allowing the fingers to then pass along the fitting OD surface with further insertion of the pipe. Ultimately, the projections 96 pass into registry with an opening of the channel 100 and the fingers snap radially inward to unflex and seat the projections 96 in the channel 100. At this point, axial insertion force may be removed allowing the compressed protuberance 52 to partially relax and partially shift the pipe and coupler assembly back axially outward until the finger inward radial projection engagement with the channel resists further extraction placing the fingers under tension so as to leave the protuberance 52 under residual compression sufficient to provide desired operational sealing of the joint.

Exemplary pipe and fitting materials are selected from the group consisting of polyvinylchloride (PVC), chlorinated polyvinylchloride (CPVC), acrylonitrile butadiene styrene (ABS), polyethylene (PE, including high density polyethylene (HDPE), low density polyethylene (LDPE), and linear low density polyethylene (LLDPE)), polypropylene (PP), polystyrene (PS), polybutylene (PB), polyamide (PA), and polyvinyl difluoride (PVDF). Exemplary couplers and clamps may be from the same list or may be metallic. Particularly for the couplers, fiber-filled (reinforced) variants are relevant due to the tensile and other forces experienced by the fingers. Exemplary gaskets are natural or artificial rubbers or elastomers.

One particular example involves PP pipe, PP fittings, RYTON (trademark of Solvay SA, Brussels, Belgium) glass-filled polyphenylene sulfide (PPS) couplers, CELCON M-90 (trademark of Celanese Corporation, Dallas, Tex.) acetal copolymerclamps, and thermoplastic elastomer gaskets.

The pipe, coupler, fitting, clamp, and gasket may be made using otherwise conventional or yet-developed materials and techniques (e.g., extrusion for pipe and injection molding for other components).

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to modifying a configuration of an existing basic piping or fitting system, details of such configuration or its associated use may influence details of particular implementations. Accordingly, other embodiments are within the scope of the following claims.

What is claimed is:

1. A pipe coupler (30) being a unitary single-piece plastic molding comprising:
    an axis (500);
    a full annulus body portion (70) surrounding the axis;

a circumferentially segmented collar (72) extending from a first axial end of the body portion and having an inner diameter surface (80) and an outer diameter surface (82); and
a plurality of fingers (90) projecting from a second axial end of the body portion, axially opposite the first end and having inward radial projections (96).

2. The pipe coupler of claim 1 wherein:
the inner diameter surface has surface enhancements (84, 86).

3. The pipe coupler of claim 2 wherein:
the surface enhancements comprise circumferential ridges (84).

4. The pipe coupler of claim 1 wherein the plastic is glass-filled polyphenylene sulfide.

5. The pipe coupler of claim 1 wherein:
the inward radial projections extend radially inward and axially back toward the body portion.

6. A kit comprising the pipe coupler of claim 1 and further comprising:
a band clamp (34) dimensioned to encircle and compress the collar; and
an annular gasket (32).

7. The kit of claim 6 wherein the gasket comprises the unitarily molded combination of:
a sleeve (50); and
a protuberant ring (52) at an end of the sleeve.

8. A pipe joint comprising the pipe coupler of claim 1 and further comprising:
a pipe (120);
a clamp (34) holding the collar portion to the pipe; and
a fitting (20) having an end portion (22A) receiving an end portion (122A) of the pipe and having a backlocked engagement with the finger projections (96).

9. The pipe joint of claim 8 further comprising:
a gasket (32) compressed between the fitting, the pipe coupler, and the pipe.

10. The pipe joint of claim 8 wherein:
the fingers are under axial tension.

11. The pipe joint of claim 8 wherein:
the fitting end portion (22A) is a first end portion and the fitting has a second end portion (22B) identical to the first end portion.

12. The pipe coupler of claim 1 wherein:
the circumferentially segmented collar has:
a plurality of segments (74) separated by respective gaps (76); and
an inner diameter surface formed with a series of inward annular projections (84) and grooves (860).

13. A method for using the pipe coupler of claim 1, the method comprising:
installing the pipe coupler to a pipe (120);
tightening a clamp (34) surrounding the segmented collar to clamp the segmented collar to the pipe; and
installing the pipe coupler and pipe as a unit to a pipe fitting via axial translation:
inserting an end portion of the pipe into an end portion of the pipe fitting; and
the finger projections becoming captured behind an adjacent surface (62) of an end portion (22A) of the pipe fitting.

14. The method of claim 13 further comprising:
applying a gasket (32) to the pipe.

15. The method of claim 13 wherein:
the translating compresses a gasket (32) between a rim (24A) of the fitting end portion and the body portion.

16. The method of claim 15 further comprising:
releasing an external force providing the translating so as to leave: the gasket compressed between the rim of the fitting end portion and the body portion; and the fingers under axial tension.

17. A pipe fitting (20) comprising:
an end portion (22A; 22B) having an inner diameter surface, an outer diameter surface and a rim (24A; 24B);
first means (26) on the end portion for engaging an electrofusion collar (200); and
second means (100) on the end portion for engaging fingers (90) of a coupler (30) alternatively to the electrofusion collar.

18. The pipe fitting of claim 17 wherein:
the second means comprises an undercut surface (62).

19. A method for using a plurality of identical pipe fittings (20), the pipe fittings comprising:
an end portion (22A; 22B) having an inner diameter surface, an outer diameter surface and a rim,
the method comprising:
with a first said fitting:
installing a heating element (202) to the end portion;
inserting a first pipe into the end portion; and
energizing the heating element to fuse the first pipe to the first said fitting; and
with a second said fitting:
installing a pipe coupler (30) to a second pipe;
installing the pipe coupler and second pipe as a unit to the second pipe fitting via axial translation:
inserting an end portion of the second pipe into the end portion of the second pipe fitting; and
projections (96) of the pipe coupler becoming captured behind an adjacent surface (62) of the end portion of the second pipe fitting.

20. The method of claim 19 wherein:
the projections (96) are inward radial projections of axially-protruding fingers (90); and
during the translation, the axially-protruding fingers (90) flex radially outward and then relax radially inward as the projections (96) of the pipe coupler become captured behind the adjacent surface (62).

21. A kit comprising:
a pipe coupler comprising:
an axis (500);
a body portion (70) surrounding the axis;
a circumferentially segmented collar (72) extending from a first axial end of the body portion and having an inner diameter surface (80) and an outer diameter surface (82); and
a plurality of fingers (90) projecting from a second axial end of the body portion, axially opposite the first end and having inward radial projections (96);
a band clamp (34) dimensioned to encircle and compress the collar; and
an annular gasket (32) comprising the unitarily molded combination of:
a sleeve (50); and
a protuberant ring (52) at an end of the sleeve.

* * * * *